United States Patent
Cox et al.

[15] 3,671,515

[45] June 20, 1972

[54] SPHERICAL PRODUCTION OF SMALL PARTICLE NITROCELLULOSE

[72] Inventors: Charles D. Cox, Bryans Road; Thomas Liggett, Indian Head, both of Md.

[73] Assignee: The United States of America as represented by the Secretary of the Navy

[22] Filed: May 20, 1970

[21] Appl. No.: 39,171

[52] U.S. Cl..............................260/223, 106/195, 149/96, 149/100, 264/3
[51] Int. Cl.......................................C08b 5/00, C08b 21/02
[58] Field of Search..............260/223, 220; 264/3 E; 149/96, 149/100

[56] References Cited

UNITED STATES PATENTS

| | | | |
|---|---|---|---|
| 2,722,528 | 11/1955 | Johnson | 260/223 |
| 2,915,519 | 12/1959 | Stewart et al. | 260/223 |
| 2,982,643 | 5/1961 | Reinhardt | 240/223 |
| 3,163,567 | 12/1964 | Silk | 260/223 |
| 3,325,315 | 6/1967 | Sapiego | 264/3 |
| 3,422,169 | 1/1969 | Brooks et al. | 264/3 |

OTHER PUBLICATIONS

Hammond, Physical Processes in the Chemical Industry, Volume II, Dispersion of Materials, New York Philosophical Library, 1958, pages 154– 157 & 160– 162.
Riegel, Chemical Process Machinery, 2nd Edition, Book Division Reinhold Publishing Corporation, New York, N.Y., 1953, pages 280– 282.

*Primary Examiner*—Donald E. Czaja
*Assistant Examiner*—Ronald W. Griffin
*Attorney*—R. S. Sciascia, J. A. Cook and R. J. Erickson

[57] ABSTRACT

An improved process for manufacturing spherical small particle nitrocellulose wherein the prepared nitrocellulose lacquer is mixed with water and immediately subjected to a high shear emulsifying action to form the desired particles. No colloids, surfactants or emulsifying agents are employed in the process.

8 Claims, No Drawings

SPHERICAL PRODUCTION OF SMALL PARTICLE NITROCELLULOSE

BACKGROUND OF THE INVENTION

This invention generally relates to nitrocellulose production processes and more particularly to an improved process for the manufacture of nitrocellulose in the form of small spherical particles.

Past experiences with propellants employing small particle size (9–12 microns) nitrocellulose (known as plastisol nitrocellulose, PNC), which has been manufactured according to prior art procedures, have demonstrated at least two notable disadvantages. Firstly, it has been observed that various high energy ingredients are incompatible with the residual emulsifying agent, present in the nitrocellulose, via its utilization during the nitrocellulose manufacturing process. Secondly, a lumping problem exists when the PNC is dried, without first thoroughly pulverizing; apparently a further result of the presence of residual emulsifying material.

Thus, a need exists for a process for manufacturing small particle size spherical nitrocellulose which avoids these and other problems encountered with the prior art nitrocellulose.

SUMMARY OF THE INVENTION

Accordingly, it is one object of this invention to provide an improved process for the manufacturing of small spherical particle nitrocellulose.

Another object of the instant invention is to provide an improved process for manufacturing small particle nitrocellulose which eliminates the use of emulsifying, colloid or surfactant agents and thereby eliminates the concomitant disadvantages of the residual quantities of these materials in the final nitrocellulose product.

Still another object of the present invention is to provide a simpler process for manufacturing small particle nitrocellulose than prior art processes.

These and other objects are achieved by providing a process for manufacturing nitrocellulose in small spherical particles which is similar to prior art processes except that the present process does not contain a pre-emulsion step, i.e., the nitrocellulose lacquer is not dispersed in water containing a surfactant, colloid or emulsifying agent; furthermore, the process of this invention employs a modified and improved emulsification step not heretofore used in the prior art processes.

DESCRIPTION OF THE PREFERRED EMBODIMENTS

In accordance with the process of this invention, a nitrocellulose lacquer is prepared, as in past procedures, by dissolving nitrocellulose, preferably water-wet, in an organic water miscible or water soluble volatile solvent medium, such as nitromethane. The organic solvent medium employed may be any of those used in the past for this purpose. Some of these are, for example, in addition to nitromethane, the lower aliphatic alcohols, for instance, methyl, ethyl and propyl alcohol, acetone, methyl ethyl ketone, methyl acetate, ethyl acetate, the like and mixtures thereof. Specifically, some binary solvent systems that are also applicable herein include dioxane-alcohol, methyl ethyl-ketone-benzene, ether-alcohol, methylfuran-alcohol and the like. Preferably, the solvent employed whether single or binary should be soluble in water at least to the extent of 5 parts per 100 parts of water at 20° C.

The concentration of nitrocellulose, as in past procedures, may vary within a wide range. Generally, the choice of solvent, the viscosity of nitrocellulose employed and the viscosity of the lacquer which varies with different solvents are influencing factors upon the nitrocellulose concentration in the lacquer and therefore it may be varied accordingly. However, for optimum results and for easier process control and handability, the nitrocellulose content should not exceed about 35 percent by weight and is preferably within the range of from about 1.5–16 percent by weight. Excellent small particle size has been obtained at about 5 percent by weight nitrocellulose. If desired, minor amounts of a stabilizer, such as ethyl centralite and 2-nitro-diphenylamine may also be included in the lacquer formulation.

In carrying out the lacquer preparation and continuing through the separation of the nitrocellulose particles within the scope of this invention, any temperature at which the solvents and water are liquid are employed. However, for optimum solubility effects it has been determined that a temperature of from about 100° F to about 150° F is preferred.

At this point, in prior processes, the nitrocellulose lacquer is then mixed with water containing a colloiding, surfactant or emulsifying agent and subsequently agitated to produce a coarse dispersion of the lacquer in water. Following this pre-emulsion procedure, emulsification is achieved, for example, by subjecting the dispersion to agitation to form a relatively uniform emulsion of lacquer particles in water.

In the present process, however, the above described pre-emulsion step of the prior art is completely eliminated, while the subsequent emulsification procedure has been improved. Thus, in the practice of this invention, the emulsification of the nitrocellulose lacquer is accomplished by directly feeding the lacquer and a quantity of water, which does not contain any colloiding, surfactant or emulsifying agent, into an emulsifying unit. It is important that there be a very short period between the mixing of the nitrocellulose lacquer and water and the point of emulsifying action since premature mixing causes the extraction of the solvent, e.g., nitromethane, by the water and results in the precipitation of the nitrocellulose in an undesirable form. Therefore, for optimum results, the nitrocellulose lacquer and water are carried as close as possible to the emulsifying action before they are mixed. Thus, any convenient means for achieving this is applicable herein.

One such means, within the scope of the present invention, is provided by an arrangement of concentric tubes into which the nitrocellulose lacquer and water are individually fed, with the lacquer in the inner tube and the water in the outer tube or vice versa. The outlets of these tubes are situated so that they are terminted at the initial area of (about one-sixteenth to about 1 inch from) the emulsifying action thereby providing for a mixing of the lacquer and water and the immediate and almost simultaneous subjection thereto of emulsifying action.

Another method for preventing premature mixing, which provides for similar results, is a Y type or other adjacent opening conduit system where the openings are located in the emulsifying action area.

Within the practice of the present invention, the mixed lacquer and water is subjected to a high shear emulsification action. Such emulsification action may be provided by any of a number of well known means. For example, rotor-stator devices, which operate basically by passing the mixture through the very narrow annular space between a rotor and a stator (e.g., colloid mills) are employed herein. Turbines, turbodispersers, and other emulsifying devices characterized by a high speed rotor and matching stationary stator are included in this classification.

Other high shear emulsification means also within the scope of this invention are the pressurized fluid devices, wherein the mixture is expelled at high pressure through the annular space between a valve and its seat (e.g., homogenizers). Specifically, some of these are known as Hydropulse homogenizers, manufactured by Scott and Williams, Inc., Laconia, N. H. and the Logeman Laboratory Homogenizer, manufactured by C. W. Logeman Company, Brooklyn, New York.

The vibrational devices, operating via a vibrating element which causes cavitation and results in particulate dispersion (e.g., ultrasonic, electromagnetic, and magnetostriction emulsifiers) are also applicable herein.

A full discussion of high shear emulsifying equipment which are applicable for the purposes of the present invention may be found in Practical Emulsions, Vol. I, by Bennett, Bishop and Wulfinghoff, Chemical Publishing Company, 1968.

Upon emulsification of the nitrocellulose lacquer and water mixture, the lacquer is broken up into small particles which are suspended in water. The quantity of water employed in the emulsification procedure is somewhat of a factor in determining the ultimate particle size of the nitrocellulose. Particle size is a function of the lacquer-water ratio inasmuch as increasing the amount of water increases the particle size. Thus, the quantity of water used in emulsification is determined to some extent by the particle size desired, among other factors, such as temperature. In general, satisfactory results in terms of desired particle characteristics are attained where the water to solvent ratio is within a range of from about 0.5:1 to about 1:1 based on volume although lesser or greater amounts of either may be employed. However, in the interest of desirable product characteristics and ease of operation, it is probably advantageous if this ratio does not exceed about 5:1.

After emulsification is completed, the organic solvent may be removed from the particles by distillation or dilution, among other methods. Distillation may be accomplished by simply heating the emulsion to a temperature at or near the boiling point of the solvent. The dilution process entails drowning the emulsion in a large quantity of water. This results in a migration of the solvent from the nitrocellulose into the water phase. The total amount of water employed in addition to being in excess of the theoretical amount required for solution of the solvent, should also be in sufficient quantity so as to prevent coalescing of the nitrocellulose particles.

After the distillation or dilution process, the nitrocellulose particles are separated from the remaining liquid and dried. Separation may be accomplished by any of the convenient prior art procedures such as filtration or centrifugation. Obviously, no washing of the nitrocellulose particles in an attempt to remove residual colloids, surfactants, or emulsifying agents (as performed in past procedures) is necessary in the present process since none of these materials are utilized.

The nitrocellulose particles prepared according to process of this invention are spherical and are obtained in sizes on the average of from about 5–50 microns. The process, although not limited thereto, is particularly suited for the preparation of PNC, i.e., plastisol nitrocellulose, having an average particle size of from about 9–12 microns. For this purpose, nitrocellulose with a 12.6 percent nitrogen content is employed as the starting material, but lower or higher nitrogen content nitrocellulose (11.0–13.4) is also applicable within the scope of the present invention, for other well known useful purposes.

Having generally described the invention the following examples are given for purposes of illustration. It will be understood that the invention is not limited to these examples, but is susceptible to different modifications that will be recognized by one of ordinary skill in the art.

EXAMPLE 1

Forty pounds of nitromethane and 0.11 pounds of ethyl centralite were added to an agitated 5 gallon reactor. Agitation was commenced and the contents were heated to 110° F. Water wet nitrocellulose (2.2 pounds, on a dry basis) (12.6% N, 30% moisture) was then added to the reactor maintaining the temperature at 110° F. Agitation was continued until all of the nitrocellulose was dissolved (about 2 hours). Twenty-two pounds of emulsion water in a tank were heated to 140° F as were 800 pounds of drown water to 120 F. The lacquer and emulsion water were then fed to a Gifford-Wood 2-inch Pipe Line Mixer emulsifier unit via concentric tubes wherein the openings of the tubes terminate in the area of (about one-fourth inch from) emulsifying action so that the two liquids were mixed and substantially simultaneously subjected to emulsifying action. After passing through the high shear emulsifying action, the emulsion was discharged into the preheated drown water and agitated. The nitrocellulose particles are then separated by centrifugal action. The average particle size of the nitrocellulose was determined to be 11.7 microns.

EXAMPLE 2

The same procedure was employed as in Example 1, except 1500 pounds of nitromethane, 3.7 pounds of ethyl centralite and 73.5 pounds of nitrocellulose were used. Furthermore, a 250-gallon reactor was employed with the contents heated to 140° F, while the emulsion water was heated to 150° F rather than 140° F as in Example 1. The average particle size of the nitrocellulose was 15.0 microns.

EXAMPLE 3

The same procedure used in Example 1 was employed except that 7 pounds of 12.2% N nitrocellulose, 40 pounds of nitromethane and 0.35 pounds of ethyl centralite were used. Furthermore, the emulsion water and drown water were only heated to 110° F. The average particle size of nitrocellulose was determined to be 12.2 microns.

A similar procedure as employed in Examples 1–3 using 11.0% N containing nitrocellulose resulted in nitrocellulose having an average particle size of 8.5 microns.

Obviously, many modifications and variations of the present invention are possible in light of the above teachings. It is therefore to be understood that, within the scope of the appended claims, the invention may be practiced otherwise than as specifically described.

What is claimed as new and desired to be secured by Letters Patent of the United States is:

1. A process for the manufacture of small spherical particle nitrocellulose which comprises: (1) dissolving nitrocellulose in an organic water soluble or water miscible solvent to form a lacquer; (2) contacting said lacquer with a quantity of water by simultaneously feeding said lacquer and said water into a high shear emulsifying unit wherein the amount of said water varies from about one-half to about five times as much as a given volume of solvent in said lacquer; (3) subjecting the resultant mixture thereof to a high shear emulsifying action at a time no later than immediately after the contacting of lacquer and water; (4) removing the organic solvent and (5) separating the particles from the water; wherein said process is performed in the absence of an emulsifying agent.

2. The process of claim 1 wherein said contacting of the lacquer with a quantity of water occurs immediately prior to the subjection of the resultant mixture to a high shear emulsifying action.

3. The process of claim 1 wherein said contacting of the lacquer with a quantity of water and said subjecting the mixture thereof to a high shear emulsifying action occur substantially simultaneously.

4. The process of claim 1 wherein said organic water soluble or water miscible solvent is soluble in water at least to the extent of five parts per 100 parts of water at 20° C.

5. The process of claim 1 wherein said lacquer is comprised of about from 1.5 to about 35 percent by weight nitrocellulose.

6. The process of claim 1 wherein a stabilizing agent is added to the lacquer prior to contacting with water.

7. The process of claim 1 wherein said nitrocellulose has a nitrogen content of about 11.0 to about 13.4 percent.

8. The process of claim 7 wherein said nitrocellulose has a nitrogen content of about 12.6 percent.

* * * * *